United States Patent
Hahn et al.

(10) Patent No.: US 7,129,614 B2
(45) Date of Patent: Oct. 31, 2006

(54) STRIP-SHAPED LAMINA AND LAMINATED STATOR CORE FOR AN ELECTRIC MACHINE

(75) Inventors: Rolf-Dieter Hahn, Stuttgart (DE);
Wolfgang Harrer, Gerlingen (DE);
Eberhard Rau, Korntal-Muenchingen (DE); Thomas Berger, Ditzingen (DE);
Martin Henne, Moeglingen (DE);
Klaus Pflueger, Eberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/527,918

(22) PCT Filed: Sep. 22, 2003

(86) PCT No.: PCT/DE03/03154

§ 371 (c)(1),
(2), (4) Date: Nov. 14, 2005

(87) PCT Pub. No.: WO2004/030185

PCT Pub. Date: Apr. 8, 2004

(65) Prior Publication Data

US 2006/0125339 A1  Jun. 15, 2006

(30) Foreign Application Priority Data

Sep. 20, 2002 (DE) .................. 102 43 979

(51) Int. Cl.
*H02K 1/12* (2006.01)
*H02K 1/16* (2006.01)
*H02K 15/02* (2006.01)

(52) U.S. Cl. .............. 310/216; 310/217; 310/254; 310/259

(58) Field of Classification Search ............. 310/259
See application file for complete search history.

(56) References Cited

U.S. PATENT DOCUMENTS

| | | | |
|---|---|---|---|
| 3,886,256 A * | 5/1975 | Ohuchi et al. | 310/216 |
| 4,102,040 A | 7/1978 | Rich | 29/598 |
| 4,712,292 A * | 12/1987 | King | 29/596 |
| 4,901,428 A | 2/1990 | King | 29/596 |
| 6,147,431 A * | 11/2000 | Asao et al. | 310/254 |
| 6,952,069 B1 * | 10/2005 | Akatsu et al. | 310/266 |
| 7,009,322 B1 * | 3/2006 | Niimi et al. | 310/216 |
| 2004/0239190 A1 * | 12/2004 | Rau et al. | 310/10 |

FOREIGN PATENT DOCUMENTS

| | | | |
|---|---|---|---|
| DE | 26 29 532 | 1/1977 | |
| JP | 58212336 A * | 12/1983 | 310/216 |
| JP | 59063940 A | 4/1984 | |
| JP | 60051426 A | 3/1985 | |
| JP | 07087714 A | 3/1995 | |
| JP | 10225027 A | 8/1998 | |

* cited by examiner

*Primary Examiner*—Burton Mullins
(74) *Attorney, Agent, or Firm*—Michael J. Striker (57) ABSTRACT

A strip-shaped lamella (10) for a stator (30) of an electric machine, having a yoke region (12) and a number of first teeth (18) that are of one piece with the yoke region (12) on a first side (14) and have first grooves (20) between them, and having second teeth (22) that are of one piece with the yoke region (12) on a second side (16) oriented away from the first side (14) and have second grooves (24) between them. The second teeth (22) are located at a position of the first teeth (18).

9 Claims, 6 Drawing Sheets

STRIP-SHAPED LAMINA AND LAMINATED STATOR CORE FOR AN ELECTRIC MACHINE

PRIOR ART

The invention relates to a strip-shaped lamella for a stator of an electric machine as well as a laminated stator core comprised of such strip-shaped lamellas. The German patent application DE-OS 26 29 532 has already disclosed a stator for an electric machine that is comprised of a yoke packet, which is initially flat in form. To that end, strip-shaped lamellas provided with grooves are disposed so that they form a flat lamella packet. All of the grooves of the individual lamellas are oriented in the same direction, thus lending this packet the appearance of a comb. This packet, which is intrinsically flat, will be referred to below as a flat packet. In a subsequent step, this flat packet is rolled into a round shape, yielding laminated stator core that can be used in the same way as conventional annular laminated stator cores.

In a first exemplary embodiment, the prior art has disclosed a flat packet, the back of which, oriented away from its teeth, is provided with grooves designed to function as preferred folding points. The intent is to produce a cylindrical surface with a polygonal base, the corners of the polygon being constituted by the axes of the grooves. In another exemplary embodiment, the prior art has disclosed a flat packet that has a groove behind each of the teeth that are later oriented toward the rotor. Both laminated stator cores share the common trait that the round-rolled flat packets, despite being to a large extent round, are not only relatively strongly polygonal in form, but also simultaneously have relatively strong undulations of the lamellas. These undulations have a powerful negative effect, more or less, on the properties of the flat packet and round packet. Above a particular yoke height, the deformations are so great that the necessary shape and position tolerances of the packet become impermissibly pronounced.

ADVANTAGES OF THE INVENTION

The strip-shaped lamella according to present invention, with the characteristics of the main claim, has the advantage that its location of the second teeth in a position of the first teeth results in a relatively long, unnarrowed cross section of the yoke and/or yoke region and consequently achieves a very favorable degree of roundness of the round-rolled strip-shaped lamellas and of the laminated stator core composed of such strip-shaped lamellas. Bending points that reduce roundness are largely avoided. In order to achieve a favorable efficiency between the finished stator and the rotor, it is necessary to have a high degree of roundness and therefore a small gap that is as uniform as possible between the stator and rotor. The steps proposed according to present invention render it unnecessary to subsequently machine the inside of the stator, which makes the proposed steps economically significant. The bending results and therefore the roundness of the stator require a groove bottom between each pair of first teeth to extend essentially in a straight line.

A particularly favorable bending result is achieved if the groove bottom between each pair of first teeth extends in a straight line over at least 50% of its length in the first approximation. In the second approximation, a value of at least 60% is preferable. It is particularly preferable for this value to lie between 60% and 70%.

Another increase in the quality of the bending results is achieved in that the groove bottom between each pair of second teeth also extends essentially in a straight line; a further increase in the quality is achieved if the shorter of the two respectively opposing groove bottoms, with reference to the longer straight section, extends in a straight line over at least 80% of its length. It is particularly preferable for this value to lie between 80% and 93%.

If a stator manufactured with such strip-shaped lamellas is to be supported in a housing by means of the so-called axial clamping technique, then it is necessary for the stator to have a certain amount of axial clamping surface. To that end, the second groove has the narrowest cross section possible or, stated in reverse, the second teeth do in fact have the largest possible cross-sectional area, but there is a relatively small transition surface between the second teeth and the yoke region. The second groove is correspondingly embodied as trapezoidal or T-shaped. A favorable degree of roundness of the round-rolled strip-shaped lamellas and/or laminated stator core can also be achieved if a groove lying between two second teeth has a generally round form, for example oval or also circular.

The present invention also relates to a laminated stator core for an electric machine that is manufactured out of the lamellas according to the invention. A laminated stator core of this kind has a particularly favorable degree of roundness and can also be produced with only slight axial tolerances. This increases the precision with which the laminated stator core fits into a housing of an electric machine. This also increases the cooling of the stator due to the increased surface area.

In addition, an outward-facing side of the second teeth has a radius that is smaller than the radius of the stator. A convex shape of the second teeth offers a flat packet stator advantages with regard to round rolling, machining, and lacquering. It also facilitates insertion into a bearing shield.

The stamped concave form produces a punctiform and/or linear contact surface for the bending roller or the bending tool. This sharply reduces the friction during the bending process so that the bending occurs more easily and therefore more gently for the tool and the work piece.

For example, if the end surface of the radially outer edge of the stator must be machined so that a bevel or a radial insertion aid is produced, then an externally rounded tooth results in narrower cutting angles between the cutting tool and the outer tooth. This improves chip formation and reduces burr formation in the exit region of the tool.

The round contour of the outer teeth improves lacquer quality by preventing paint buildup and flow fractures during lacquering.

Due to the concave design of the teeth, the housing shield rests against each tooth at only one point when assembled.

Furthermore, the laminated stator core, composed of the lamellas according to the present invention, has at least one end lamella with second teeth that have an axial end surface that transitions into the non-axial outer contour of the second teeth by means of a rounded transition. Also with such an outer contour of the lamellas and end lamellas, a cutting surface of a cutting tool, for example a lathe chisel, cuts into the work piece at a very flat angle, for example between 30 and 45°. This also significantly improves chip formation and extends the life of the tool edge considerably. It also facilitates insertion into the bearing shield and improves machining in the axial direction.

The present invention also relates to an electrical machine with a laminated stator core that is composed of the lamellas according to the present invention. This electrical machine has an improved efficiency. Moreover, the particularly favorable degree of roundness of the laminated stator core reduces stress in the housing parts since the loads that the laminated stator core exerts on the housing parts are now distributed over a larger area, thus permitting the housing parts to be optimized in terms of their strength. The housing parts are less voluminous and therefore lighter in weight.

DRAWINGS

The drawings represent exemplary embodiments of a strip-shaped lamella according to the present invention, a laminated stator core, and an electric machine.

DESCRIPTION OF THE EXEMPLARY EMBODIMENTS

Figure 1:
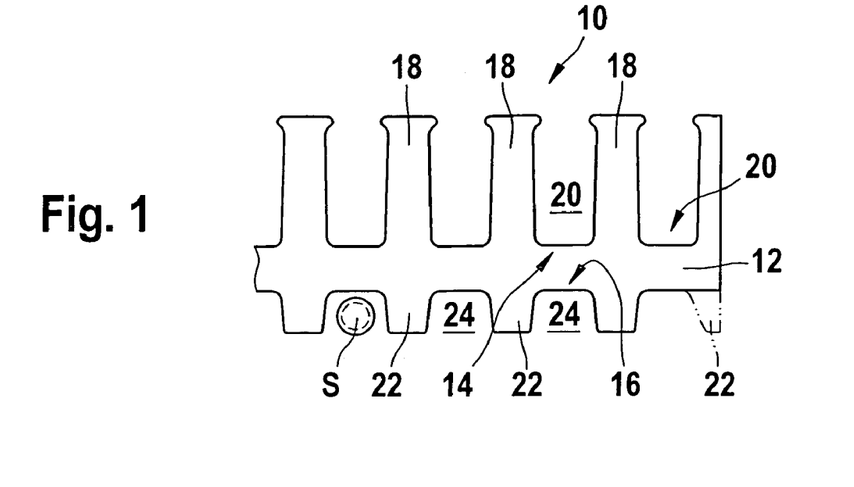
FIG. 1 shows a detail from a side view of a first exemplary embodiment of a lamella according to the present invention.

FIG. 1 shows a detail of a first exemplary embodiment of a strip-shaped lamella 10. The lamella 10 has a yoke region 12 that extends over the entire length of the lamella 10. The yoke region 12 has a first side 14 and a second side 16. The first side 14 has first teeth 18 protruding from it, with first grooves 20 between them. On the second side 16 opposite from the first side 14, there are second teeth 22, which are of one piece with the yoke region 12 and the first teeth 18. Second grooves 24 extend between the second teeth 22. With regard to the yoke region 12, an axis can be established that extends through the yoke region 12 from left to right in FIG. 1. With regard to the first teeth 18 and the second teeth 22 in connection with this axis, it can be ascertained that the second teeth 22 are located at a position of the first teeth 18. As is true of all of the exemplary embodiments for the lamellas 10, the strip-shaped lamella 10 is intended to start in a state in which the yoke region extends in a straight line and then be curved into a round form, producing an on the whole annular arrangement of each individual, originally straight, strip-shaped lamella 10. Each strip-shaped lamella 10, together with other lamellas that form a stack, is rounded so that the first teeth 18 extend toward a radial inside of a finished stator or round-rolled strip-shaped lamella. The second teeth 22 then point radially outward. In this first exemplary embodiment, the first grooves 20 and the second grooves 24 are each embodied as slightly trapezoidal, the shorter parallel side of one such trapezoid being constituted by the radial outside of the yoke region 12. The first grooves 20 are rounded at the corners, i.e. at the transitions from the second teeth 22 to the second side of the yoke region 12. In the exemplary embodiment according to FIG. 1, the first grooves 20 and the second grooves 24 have the same groove contour starting respectively from the first side 14 and the second side 16 of the yoke region 12; the first groove 20 is larger and therefore naturally deviates from the groove contour of the second groove 24 starting from a length that corresponds to that of the second groove 24. The half-sized second tooth 22 indicated with dot-and-dash lines is optional. For space reasons, regardless of the dimensions the first and second teeth and regardless of their association to one another, at least one screw shaft S is positioned in the grooves 24 when the electric machine is assembled and serves to clamp a stator composed of the lamellas 10 by means of at least two housing parts.

Figure 2:
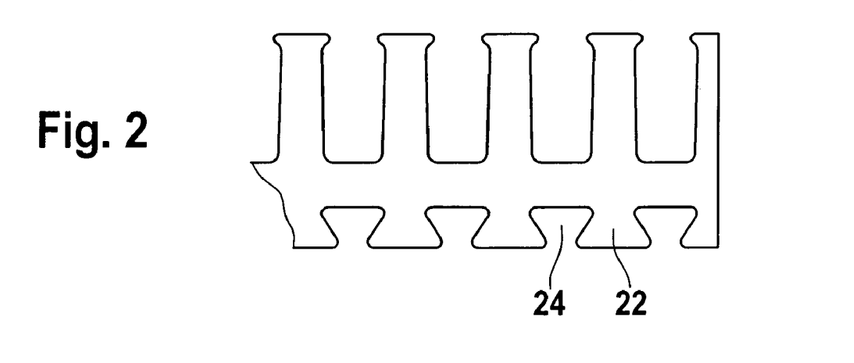
FIG. 2 shows a side view of a second exemplary embodiment of a lamella according to the present invention.

In the exemplary embodiment according to FIG. 2, the lamella 10 is provided with a different outer contour, i.e. with different second teeth 22. When it undergoes round rolling, the strip-shaped lamella 10 in the exemplary embodiment according to FIG. 2 behaves in precisely the same way as the one shown in FIG. 1. The difference between the two exemplary embodiments lies in the fact that the second teeth 22 of the second exemplary embodiment have a larger surface area in the axial direction, i.e. as shown in the depiction according to FIG. 2. A clamping force acting in the axial direction on the stator installed in a generator housing thus acts on the enlarged second teeth 22. It is thus possible to increase the clamping force and decrease the load on the teeth 22. In the exemplary embodiment according to FIG. 2, the second groove 24 is trapezoidal.

Figure 3:
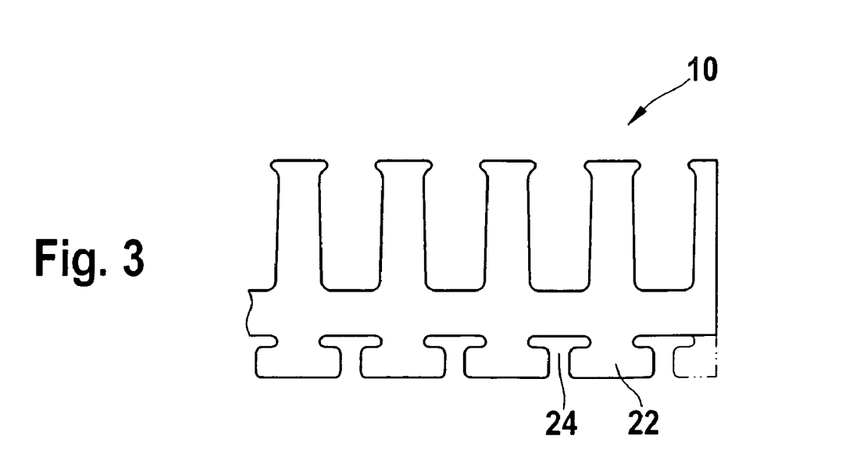
FIG. 3 shows a side view of a third exemplary embodiment of a strip-shaped lamella.

The exemplary embodiment according to FIG. 3 shows an embodiment of the lamella 10 that is further optimized in terms of the load exerted by axial clamping forces, in which the second grooves 24 have only a T-shape.

Figure 3A:
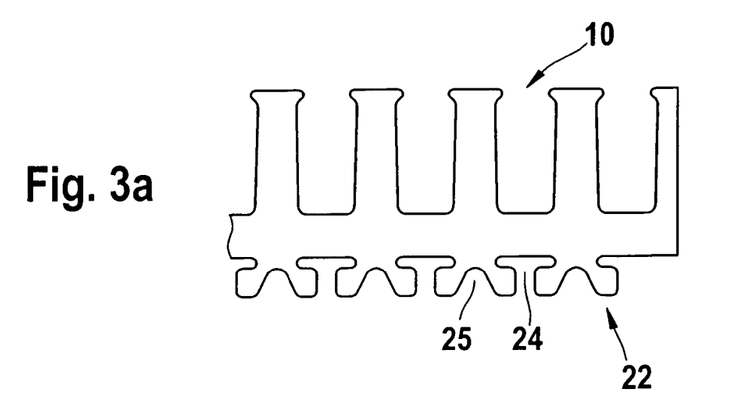

FIG. 3a shows a variant of the second teeth that is optimized in terms of the bending deformation on the outside of the yoke region 12 that occurs while the flat packet is being rounded. The second teeth 22 shown here have an approximately central indentation 25 so that the second teeth 22 deform only slightly and the rigidity of the flat packet consequently remains largely intact for the axial clamping of the stator in the housing.

Figure 4:
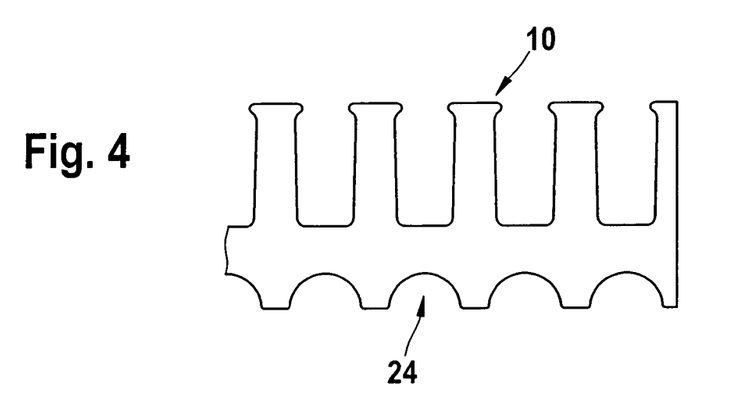
FIG. 4 shows a side view of a fourth exemplary embodiment of a strip-shaped lamella.

In the exemplary embodiment according to FIG. 4, the second grooves 24 are generally round in shape. This generally round shape can be an oval shape, a circular shape, or a semicircular shape as depicted in FIG. 4.

Figure 5:
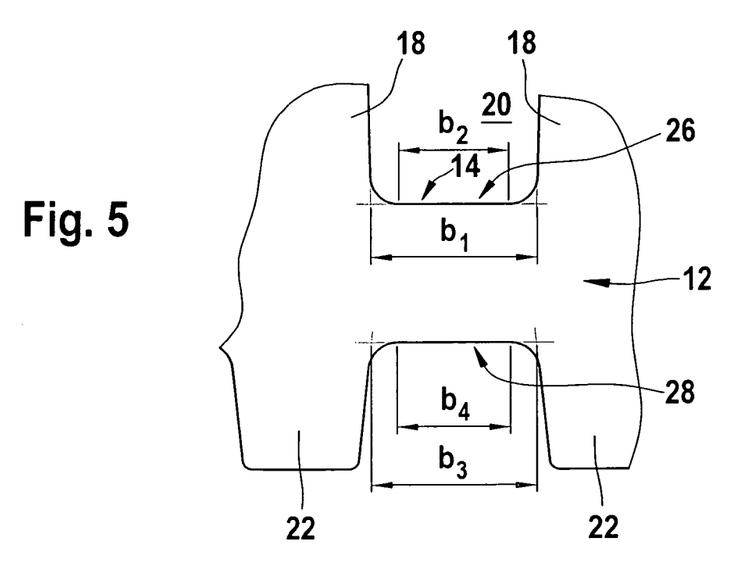
FIG. 5 shows an enlarged detail of a yoke region between two first and second teeth.

In FIG. 5, the geometry of the first grooves 20 and second grooves 24 in the yoke region 12 are explained in detail. In the first grooves 20, two dimensions are of particular initial interest. The first dimension $b_1$ represents the width of the first groove 20, which is determined by theoretically extending the tooth flanks of the first groove 20 until they intersect with the imaginary extension of the first side 14. The distance between these two intersection points is the starting value. The second dimension in the first grooves 20 is the dimension $b_2$, which corresponds to the perfectly straight portion at the groove bottom of a groove 20. A groove bottom 26 extends between each pair of first teeth 18, essentially in a straight line at first. In addition, the groove bottom 26 between each pair of first teeth 18 extends in straight line for at least 50% of its length. The minimum value of 50% corresponds to a ratio of $b_2$ to $b_1$.

In addition, with regard to the second teeth 22 and with regard to the groove bottom 28 between two second teeth, this groove bottom also extends in an essentially straight line. The width $b_3$ is determined in a manner analogous to that of the width $b_1$; the width $b_4$ is determined in a manner analogous to that of the width $b_2$. The ratio between $b_4$ and $b_3$ is advantageously such that the groove bottom 28 between each pair of second teeth 22 extends in a straight line for at least 65% of its length.

A favorable value for the ratio between $b_2$ and $b_1$ has turned out to be roughly 65%.

An analogously favorable ratio between $b_4$ and $b_3$ lies between 60% and 85%, or even better, between 60% and 75%. The best ratio has turned out to lie in the range between 63% and 71%.

Figure 6:
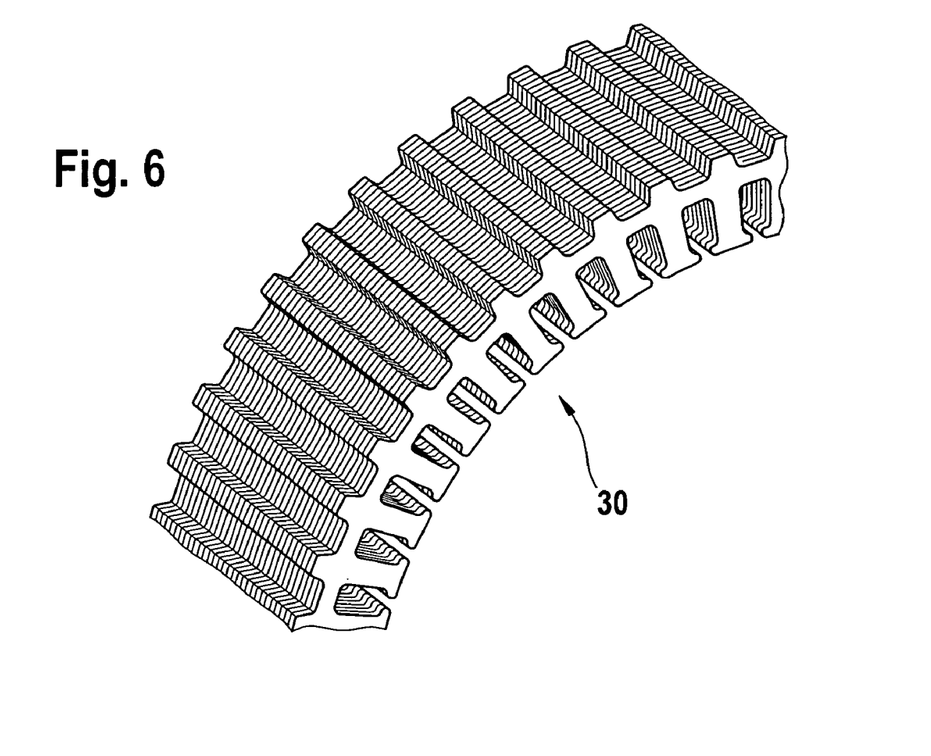
FIG. 6 shows a detail of a stator composed of lamellas according to the first exemplary embodiment.

FIG. 6 shows a detail of a stator 30 comprised of lamellas 10 according to the exemplary embodiment shown in FIG. 1. The stator 30 has second teeth 22 on its outer circumference that transmit the corresponding axial force exerted by the intrinsically known axial clamping technique.

Figure 7:
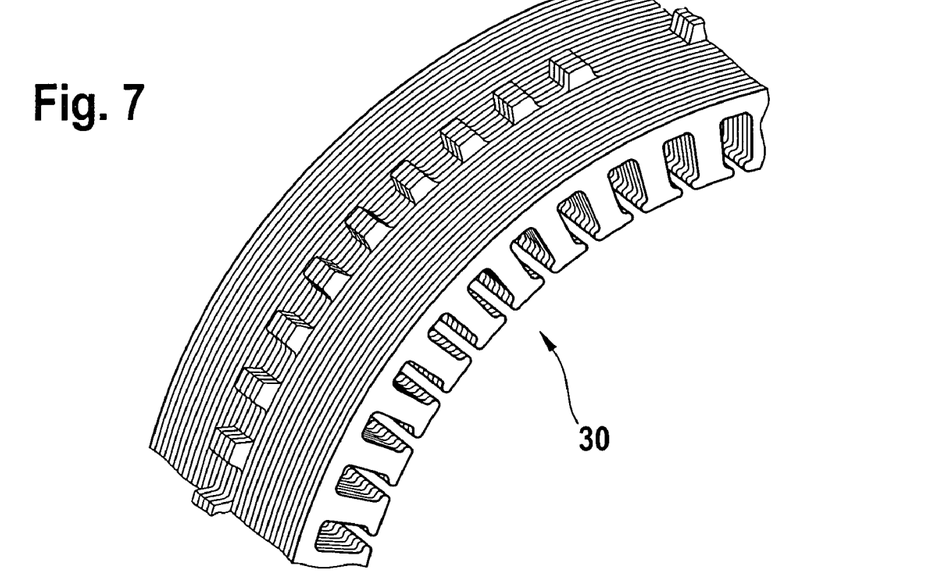
FIG. 7 shows a detail of another exemplary embodiment of a stator.
Figure 8:
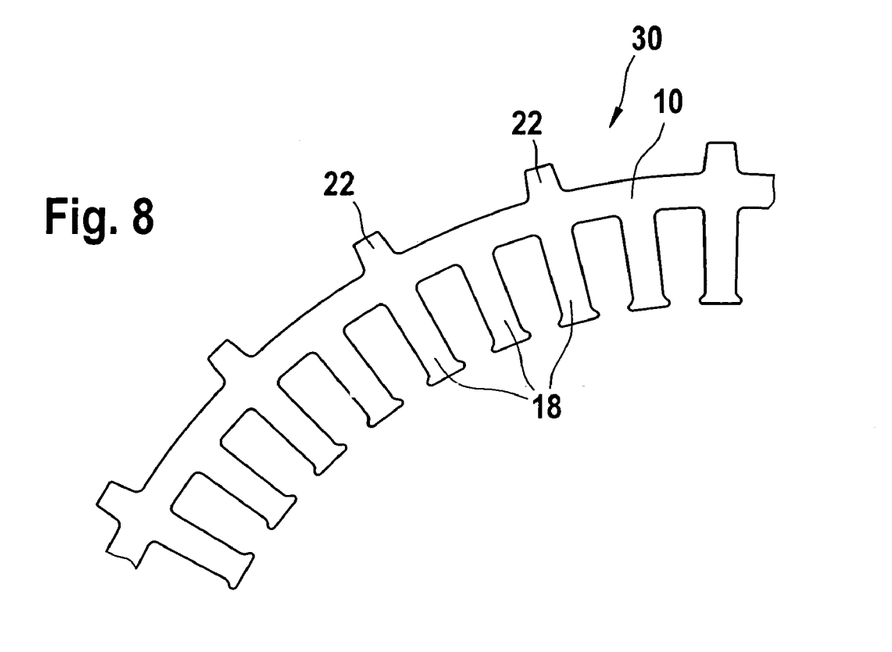
FIG. 8 shows a detail of a third exemplary embodiment of a stator.

FIG. 7 also shows a stator 30. By contrast with the exemplary embodiment according to FIG. 6, though, the stator 30 has lamellas according to the present invention only in a central region. These lamellas 10 do likewise serve to absorb axial forces, but are also used for implementing the intrinsically known center lamella clamping technique. In the axial direction to the right and left of the center lamellas in the stator 30 described here, there are lamellas without second teeth 22 so that their outer circumference is essentially cylindrical. FIG. 8 depicts an exemplary embodiment of another stator 30 in which only every other first tooth 18 is associated with a second tooth 22.

Figure 9:
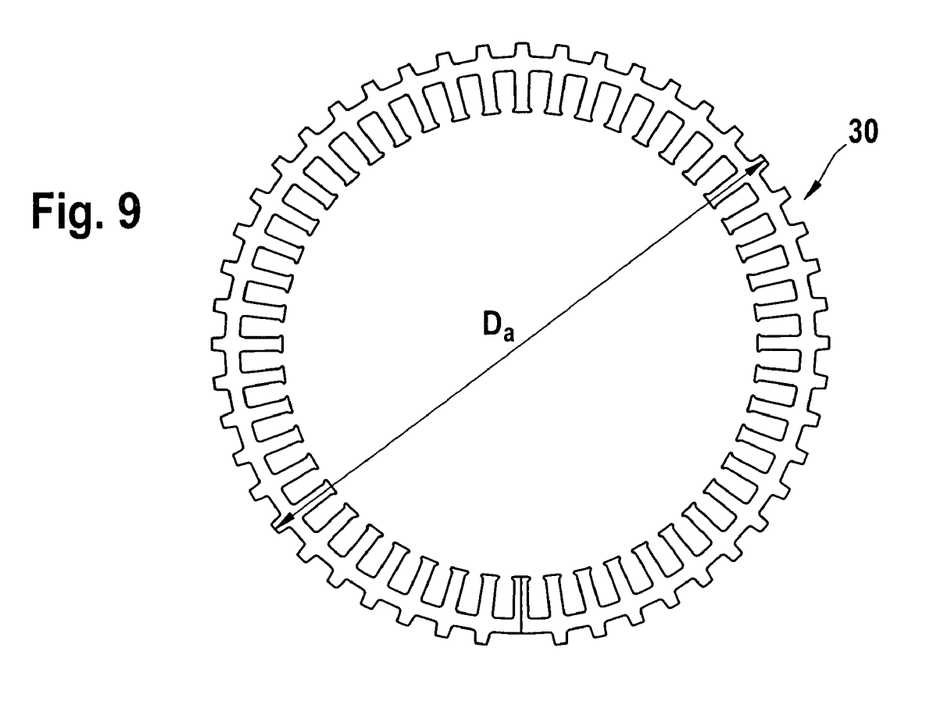
FIGS. 9 to 13 show side views of the stator yoke and the outer teeth.
Figure 10:
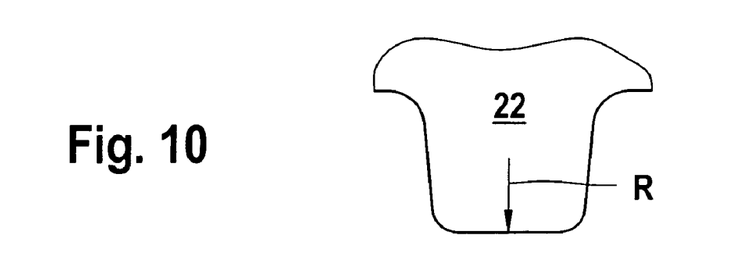

FIG. 9 shows that the outer diameter Da of a stator 30 also includes the entire length of the second teeth 22. For technical reasons related to the bending process, the second teeth 22 are provided with a particular design on the radial outside of the teeth 22 so as to induce the least amount of friction possible between a bending tool and the outside of the strip-shaped laminated stator core while the strip-shaped laminated stator core is in the process of being bent. In an exemplary embodiment according to FIG. 10, the radially outer contour of the second tooth 22 has a radius R on the order of half the diameter Da. Preferably, the radius is shorter than the radius of the stator 30.

Figure 11:
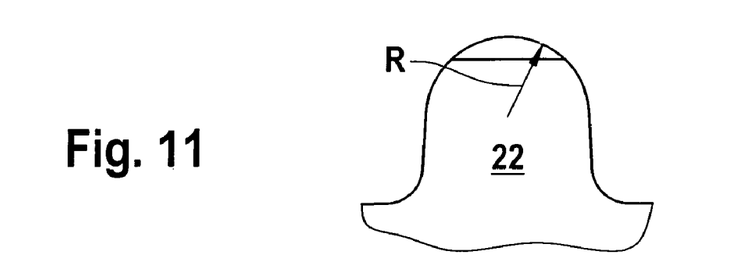

According to the exemplary embodiment shown in FIG. 11, the radially outer contour has a radius R on the order of roughly 50 to 60% the peripheral width of a second tooth 22; the radius is therefore much shorter than the radius of the stator 30.

Figure 12:
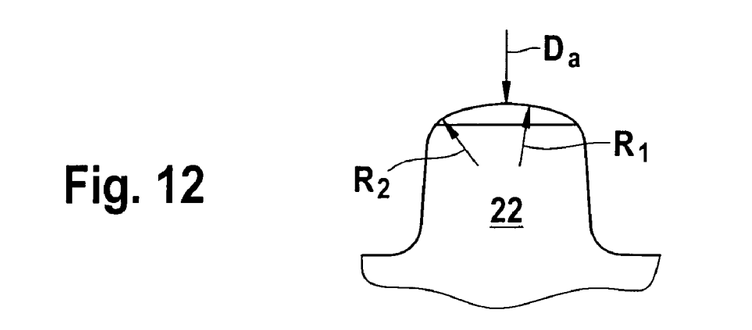

According to the exemplary embodiment shown in FIG. 12, the radially outer contour has a radius R that continually decreases in length the further it is from the outer diameter Da, finally transitioning into the lateral tooth flanks with a radius R of roughly 15 to 30% the peripheral width of the second tooth 22. The outer diameter Da is greater than R1 and R1 is greater than R2. An advantageous value range for the radius R has turned out to be between 1.5 mm and 10 mm.

Figure 13:
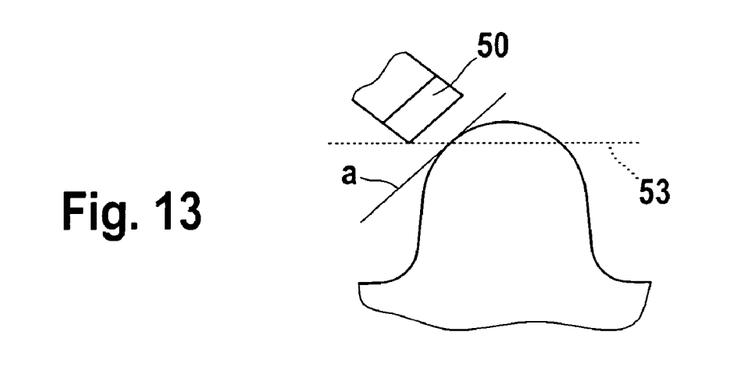

Optionally, the outer corners of the second teeth 22 can be radially and axially beveled in relation to the stator, FIG. 13, or a stator insertion aid can be lathed onto them, i.e. they can be lathed down to a cylinder, to facilitate insertion of the stator into an opening of a housing in which the stator is to be accommodated.

The smaller an angle a enclosed between the radially outer contour and a bevel edge 53 being provided, the more favorable the chip flow when beveling by means of a cutting tool 50. In addition, this also improves burr formation.

Rounded edges on the second teeth 22 also improve the lacquering quality since considerably less paint buildup occurs.

Figure 14:
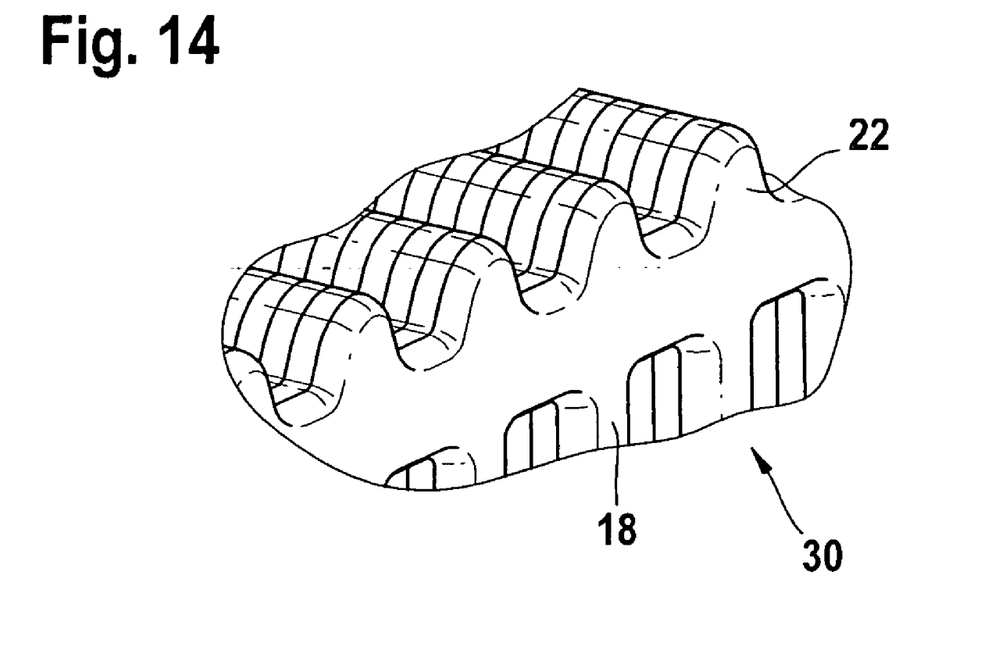
FIG. 14 shows an end lamella with a rounded transition from the end surface to the outside of the outer teeth, FIG. 15 symbolically depicts an electric machine.

FIG. 14 shows a detail of a laminated stator core 30 that is composed of the lamellas according to the present invention, which has at least one end lamella with second teeth 22 that have an axial end surface that transitions into the non-axial outer contour of the second teeth 22 by means of a rounded transition. This shape can be produced, for example, by being stamped onto the outer lamella strip of the flat packet, before or after packeting. The rounding is preferably provided on the radial outside of the outer teeth, but also on the peripheral sides of the teeth. In addition, the contour of the first teeth 18 is also rounded, thus making it possible to avoid damaging inserted windings, particularly while the laminated stator core is being rounded.

Figure 15:
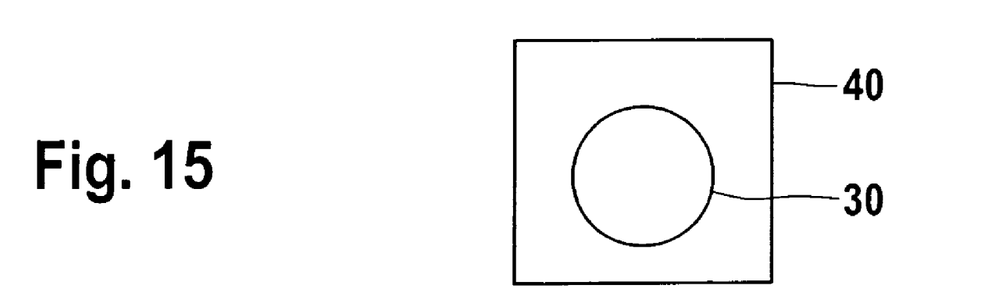

FIG. 15 shows an electric machine 40 that has a stator 30 or a laminated stator core comprised of the lamellas 10 according to the present invention.

The laminated stator core comprised of the lamellas 10 according to the present invention, i.e. the previously mentioned flat packet, is provided with a stator winding before being rolled round and the coil sides of this stator winding are accommodated completely inside the first grooves 20 before the round rolling is carried out. The disposition of the coil sides depends on the winding design.

What is claimed is:

1. A strip-shaped lamella for a stator of an electrical machine, comprising a yoke region; a number of first teeth that are of one piece with said yoke region on a first side of said yoke region and having first grooves between said first teeth; second teeth that are of one piece with said yoke region and are located at a position of said first teeth on a second side of said yoke region oriented away from said first side and having second grooves between said second teeth, said second teeth having a width b4 which corresponds to a perfectly straight portion of a groove bottom and a width b3 which corresponds to a distance between two intersecting points, said intersecting points being determined by theoretically extending tooth flanks of said second groove so that they intersect with imaginary extensions of said groove bottom, and a ratio between the widths b4 and b3 is between 60% and 85%.

2. A strip-shaped lamella as defined in claim 1, wherein said groove bottom between each pair of said first teeth extends substantially in a straight line.

3. A strip-shaped lamella as defined in claim 2, wherein said groove bottom between each pair of said first teeth extends in a straight line for at least 50% of its length.

4. A strip-shaped lamella as defined in claim 2, wherein said groove bottom between each pair of said second teeth extends in a straight line for at least 65% of its length.

5. A strip-shaped lamella as defined in claim 1, wherein each of said second grooves has a shape selected from the group consisting of a trapezoidal shape and a T shape.

6. A strip-shaped lamella as defined in claim 1, wherein an outward facing side of each of said second teeth has a radius that is shorter than a radius of the stator.

7. A laminated stator core for an electrical machine, comprising a plurality of strip-shaped lamellas, each of said lamellas having a yoke region, a number of first teeth that are of one piece with said yoke region on a first side of said yoke region and having first grooves between said first teeth; second teeth that are of one piece with said yoke region and are located at a position of said first teeth on a second side of said yoke region oriented away from said first side and having second grooves between said second teeth, said second teeth having a width b4 which corresponds to a perfectly straight portion of a groove bottom and a width b3 which corresponds to a distance between two intersecting points, said intersecting points being determined by theoretically extending tooth flanks of said second groove so that they intersect with imaginary extensions of said groove bottom, and a ratio between the widths $b_4$ and $b_3$ is between 60% and 85%.

8. A laminated stator core as defined in claim 7; and further comprising at least one end lamella with said second teeth that have an axial end surface that transitions into a non-axial outer contour of said second teeth by a rounded transition.

9. An electrical machine, comprising a laminated stator core composed at least partially of a plurality of strip-shaped lamellas, each of said lamellas having a yoke region; a number of first teeth that are of one piece with said yoke region on a first side of said yoke region and having first grooves between said first teeth; second teeth that are of one piece with said yoke region and are located at a position of said first teeth on a second side of said yoke region oriented away from said first side and having second grooves between said second teeth, said second teeth having a width $b_4$ which corresponds to a perfectly straight portion of a groove bottom and a width $b_3$ between which corresponds to a distance between two intersecting points, said intersecting points being determined by theoretically extending tooth flanks of said second groove so that they intersect with imaginary extensions of said groove bottom, and a ratio between the widths $b_4$ and $b_3$ is between 60% and 85%.

* * * * *